United States Patent [19]

Schwanz et al.

[11] 4,227,426
[45] Oct. 14, 1980

[54] DEVICE FOR LONGITUDINAL DISPLACEMENT OF A FLEXIBLE DRIVE WIRE

[75] Inventors: Wilfried Schwanz, Ahnsen; Ulrich Seiffert, Braunschweig, both of Fed. Rep. of Germany

[73] Assignee: Volkswagenwerk Aktiengesellschaft, Wolfsburg, Fed. Rep. of Germany

[21] Appl. No.: 38,192

[22] Filed: May 11, 1979

[30] Foreign Application Priority Data

May 13, 1978 [DE] Fed. Rep. of Germany ....... 2821153

[51] Int. Cl.² ............................................. F16H 1/20
[52] U.S. Cl. .................................. 74/424.8 R; 74/459
[58] Field of Search .................... 49/349, 352; 74/459, 74/424.8 R

[56] References Cited

U.S. PATENT DOCUMENTS

| 2,443,020 | 6/1948 | Beier | 74/459 |
| 2,936,646 | 5/1960 | Gould | 74/424.8 R |
| 3,654,816 | 4/1972 | Beery | 74/424.8 R |

Primary Examiner—Kenneth Dorner
Assistant Examiner—Conrad Berman
Attorney, Agent, or Firm—Brumbaugh, Graves, Donohue & Raymond

[57] ABSTRACT

A device for driving a flexible wire having a helical coil therearound along its length comprises a hollow shaft adapted to receive the wire and a motor for rotating the hollow shaft in either direction about its longitudinal axis. The shaft has a projection extending into the interior of the hollow shaft and adapted to engage the wire in the gap between adjacent turns of the helical coil. Upon rotation of the shaft and thereby the projection, the wire is driven longitudinally through the hollow shaft.

5 Claims, 3 Drawing Figures

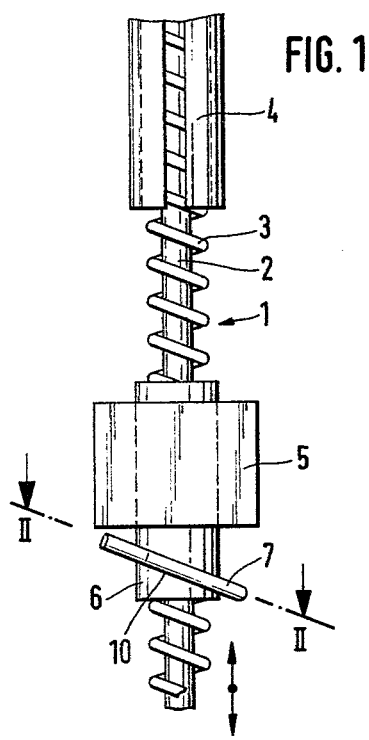
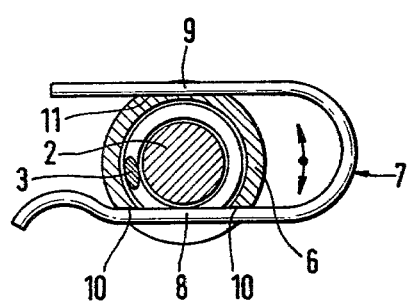
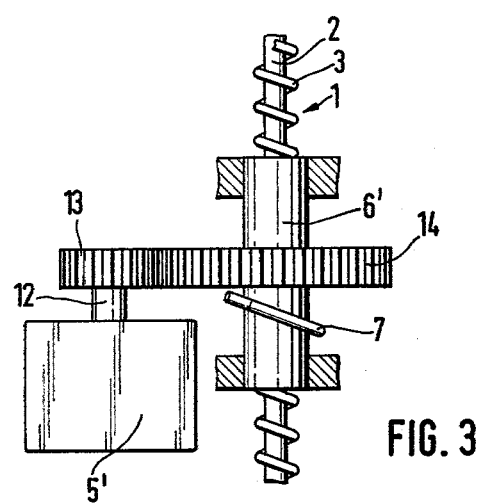
FIG. 1
FIG. 2
FIG. 3

DEVICE FOR LONGITUDINAL DISPLACEMENT OF A FLEXIBLE DRIVE WIRE

BACKGROUND OF THE INVENTION

The present invention relates to a device for driving a flexible wire having a helical coil therearound along its length.

Flexible sheathed wires are commonly used as connectors for transmitting pull or push forces to actuate window panes, sun roofs, and passive safety belt systems in motor vehicles. A reversible motor drives the wire back and forth as desired. A worm gear on the motor output engages a gear pinion which meshes with the thread-like recesses between the adjacent turns of the helical coil of the wire, thereby to drive the wire back and forth. The transmission is, however, relatively expensive due in part to the use of the gear pinion and worm gear.

SUMMARY OF THE INVENTION

The present invention is a device for driving a flexible wire having a helical coil therearound along its length which is simple in construction, and thus less costly.

More particularly, the device comprises a hollow shaft adapted to receive the wire and a motor for rotating the hollow shaft in either direction about its longitudinal axis. A projection on the shaft extends into the interior of the shaft and engages the wire in the gap between adjacent turns of the helical coil. Upon rotation of the shaft, the rotating projection drives the wire through the shaft.

In the preferred embodiment of the invention, the wall of the hollow shaft has a slot formed therethrough at an angle corresponding to the pitch angle of the helical coil of the wire. The slot receives a U-shaped spring wire clip such that one arm is disposed in the slot and projects into the interior of the hollow shaft to engage the wire.

The hollow shaft may itself be the output shaft of the drive motor, or may be coupled to the motor by a gear arrangement.

The device according to the present invention is simple in construction, and is a relatively inexpensive arrangement for translating the rotary motion of the motor to the longitudinal drive motion of the wire. Wherein motor operated flexible wire drives are now primarily used only in luxury automobiles, the lower cost of a device according to the present invention makes motor operated flexible wire drives available for other, more cost conscious, applications.

In the preferred embodiment of the invention, the U-shaped clip serves as a simple overload protection for the transmission. In the case of an excessive pull or push force of the wire, the spring force retaining the clip in the gap between the coils yields and the wire is free to move.

For a better understanding of the invention, reference is made to the following detailed description of the preferred embodiments, taken in conjunction with the drawings accompanying the application.

BRIEF DESCRIPTION OF THE DRAWINGS

FIG. 1 is a side view of a wire having a helical coil along its length and a transmission for driving the wire;

FIG. 2 is a sectional view taken through lines II—II of FIG. 1; and

FIG. 3 is a side view of a wire having a helical coil therearound along its length and an alternative embodiment of a transmission for driving the wire.

DETAILED DESCRIPTION OF THE PREFERRED EMBODIMENT

Referring to FIGS. 1 and 2, a transmission according to the invention, includes a motor 5 having a hollow output shaft 6 rotatable about its longitudinal axis. A drive wire 1, with a helical coil 3 around a flexible wire 2 along its length, extends through a sheath, for example a slit tube 4, such that the wire 1 conveys both pulling and pushing forces. A sheathed wire of this type is particularly suited for raising and lowering window panes in the doors of automobiles, or for moving a passive seat belt system back and forth. The wire 1 is received in the hollow shaft 6 of the motor 5 with a slight clearance.

The hollow shaft 6 has a pair of slots 10 and 11 arranged transversely to the longitudinal axis of the shaft 6, and preferably following the pitch angle of the turns of the helical coil 3. One of the slots 10 is cut or formed deep enough to extend through the wall of the hollow shaft 6, to expose the interior of the shaft 6. The other slot 11 is cut or formed partway into the wall of the shaft 6.

A U-shaped spring clip 7 engages the hollow shaft 6, with one arm 9 disposed in the partial slot 11, and the other arm 8 in the through slot 10. The arm 8 projects into the interior of the hollow shaft 6 and engages the wire 1 in the gap between adjacent turns of the helical coil 3.

Upon rotation of the shaft 6 by the motor 5, the arm 8 projecting into engagement with the coils 3 pushes or pulls the wire 1 through the hollow shaft 6, depending upon the direction of rotation of the motor 5.

In order to assure that the wire 1 is actually displaced longitudinally, and not simply rotated as the hollow shaft 6 and spring clip 7 rotate, a tab (not shown) which is slidably received in the slit of the sheath 4 may be attached to the wire 1. As the wire is driven, the tab would slide back and forth in the slit and prevent the wire 1 from rotating. Alternatively, the end of the flexible wire may be attached non-rotatably to the component being driven back and forth.

An alternative drive arrangement is illustrated in FIG. 3. The hollow shaft 6, which is not part of the motor, has a gear 14 thereon, which engages a gear 13 on the ouput shaft 12 of the motor 5'.

The embodiments described above are merely illustrative of the invention. Modifications and variations of the embodiments described will be apparent to those skilled in the art, without departing from the inventive concepts disclosed herein. For example, instead of the arm 8 of the wire clip 7, the projection engaging the gap between adjacent turns of the helical coil may be a tooth-like member attached to, formed on, or engaging the hollow shaft to be rotatable with the hollow shaft, and extending into the interior of the hollow shaft. Also a series of inwardly facing projections disposed in the gap between adjacent coil turns may be used. All such variations and modifications are intended to be within the scope of the present invention, as defined in the following claims.

We claim:

1. A device for driving a flexible wire having a helical coil therearound along its length comprising a hollow shaft adapted to receive the wire, motor means for rotating the hollow shaft in either direction about its longitudinal axis, and wherein said shaft has a projection extending into the interior of said shaft adapted to engage said wire in the gap between adjacent turns of the helical coil, such that upon rotation of said shaft and thereby said projection, the wire is driven longitudinally through said shaft.

2. A device according to claim 1, wherein said hollow shaft comprises the output shaft of said motor means.

3. A device according to claim 1, wherein said hollow shaft is coupled to said motor means by gears.

4. A device acccording to claim 1, 2, or 3, wherein the wall of said hollow shaft has a slot therethrough, and further comprising a U-shaped spring wire clip, wherein one arm of said clip is disposed in said slot to project into the interior of said hollow shaft to form said projection.

5. A device according to claim 4, wherein said slot is arranged at an angle corresponding to the pitch angle of the helical coil.

* * * * *